J. B. GLOWACKI

RENEWABLE FUSE ELEMENT

July 4, 1933.

Re. 18,886

2 Sheets-Sheet 1

Original Filed Aug. 11, 1927

Inventor

John B. Glowacki by Charles Hill

Atty

J. B. GLOWACKI

RENEWABLE FUSE ELEMENT

July 4, 1933.

Re. 18,886

2 Sheets-Sheet 2

Original Filed Aug. 11, 1927

Inventor

John B. Glowacki

Charles W. Hills by

Attys.

Reissued July 4, 1933

Re. 18,886

UNITED STATES PATENT OFFICE

JOHN B. GLOWACKI, OF CHICAGO, ILLINOIS

RENEWABLE FUSE ELEMENT

REISSUED
JUL 4 1933

Original No. 1,788,623, dated January 13, 1931, Serial No. 212,239, filed August 11, 1927. Application for reissue filed February 1, 1932. Serial No. 590,279.

This invention relates to variable capacity renewable fuse elements adapted primarily for use in so called cartridge fuses of the knife blade type.

It is an object of this invention to provide a renewable fuse element of an improved design or shape wherein the end forked sections are tapered outwardly providing an enlarged area adjacent the inner ends of said sections where they connect up with reduced apertured fusible connecting sections of maximum current density so that the location of fusing will be definitely located where a fusing section connects up with the enlarged end of an end section due to the fact that said enlarged end of the end section will cool more rapidly and prevent the fusing from extending outwardly to cause fusing of the fuse element with the end of a knife blade with which the renewable fuse element is associated.

It is a further object of this invention to provide an improved renewable fuse element having the end sections tapered to insure a definite blowing of the fuse at reduced apertured fusing sections without any apparent danger of the fusing spreading to solder the forked ends of the fuse element to its mounting.

It is an important object of this invention to provide a renewable fuse element of either the single or multiple type with each of the fuse plates comprising a plurality of large sections joined by reduced apertured necks or fusing sections to insure a definite location at which fusing will take place without danger of the fusing spreading due to the fact that the portions of the end sections of a fuse connected with the fusing sections are considerably enlarged in area and taper outwardly to the notched ends thereof to reduce the possibility of any fusing taking place between the notched tapered ends of the renewable fuse element and the knife blade terminal members of the fuse.

Other and further important objects of this invention will be apparent from the disclosures in the specification and the accompanying drawings.

This invention (in a preferred form) is illustrated in the drawings and hereinafter more fully described.

Figure 1:
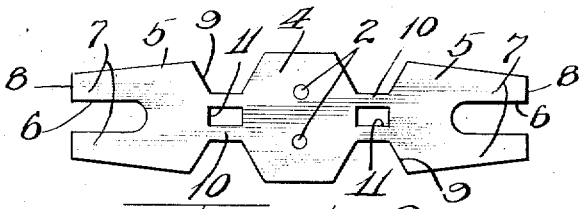
Figure 1 is a side elevation of an improved fuse element embodying the principles of this invention and illustrating the improved shape of the end sections.
Figure 2:
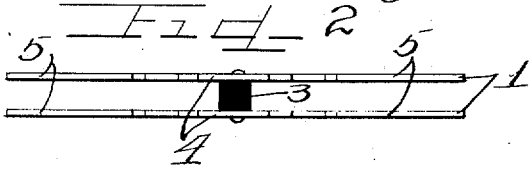
Figure 2 is a top plan view of the renewable fuse element illustrated in Figure 1 showing the same to be of a dual type.

Figures 1 and 2 illustrate an improved renewable fuse element of the dual type wherein two fuse strips or elements designated as a whole by the reference numeral 1 are constructed with their middle sections connected to one another by means of a plurality of rivets 2 surrounded by insulating spacers or separating sleeves 3. Each of the improved renewable fuse plates or elements comprises a strip of suitable resistance material of low melting point consisting of an intermediate plate or section 4 and a pair of tapered end sections 5 provided with axially directed end notches 6 which form the outer reduced ends of the end sections into tines 7 having straight transverse end edges 8. Each of the end sections 5 has formed at the inner end thereof an increased area tapered inwardly at 9 to integrally join with a neck or fuse section 10 of reduced area which is provided with a rectangular opening 11 to reduce the fusing section in area, thereby adapted to provide a section of maximum current density to insure fusing at a predetermined location. The purpose of enlarging the inner end of the end sections 5 where they join with the fusing sections 10 is to provide a larger cooling area of metal which acts to more definitely insure fusing to positively take place where said fusing sections 10 join the tapered ends 9 of the end sections. This construction tends to obviate spreading of the fusing outwardly in the end sections toward the forked ends which are adapted to be mounted in the knife blade supporting units forming part of a complete fuse in which the improved renewable fuse elements are adapted to be used. With the improved construction it will be noted that the tendency of the forked ends of the outer sections of the fuse element to become fused with the knife blade supports will be obviated, thereby permitting the end portions of a blown fuse to be readily removed from its supports without any tendency of said supports being damaged by parts of a fuse element becoming fused therewith.

Figure 3:
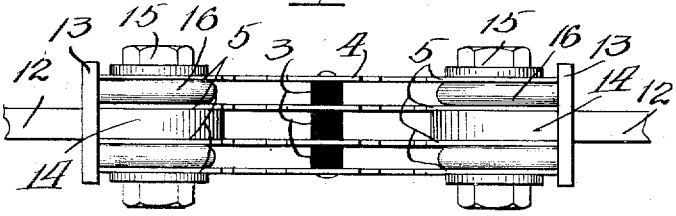
Figure 3 is a fragmentary elevational view illustrating a modified form of multiple renewable fuse element associated with knife blade mounting elements.

Figure 3 illustrates a multiple type of renewable fuse element consisting of four fuse plates or elements similar in design and construction to that illustrated in Figure 1. The four plates are disposed in spaced parallel relation to one another and are connected against rotation with respect to one another by rivets on which insulating spacers or sleeves 3 are engaged to hold the fuse plates assembled in proper spaced relation to form a unit type multiple renewable fuse element in which a plurality of fuse plates of the required capacity are rigidly connected to be mounted as a unit without any danger of a person mounting fuse element plates of the wrong capacity. This multiple type fuse element unit permits a plurality of fuse element plates to be simultaneously mounted. Figure 3, furthermore, discloses a mounting unit at each end of the fuse element forming a part of a cartridge fuse of the knife blade type. The reference numeral 12 indicates the inner end of a knife terminal having a stop plate or block 13 rigidly secured at right angles thereto, leaving an inner extension 14 of the knife blade on which a double screw member is rigidly supported parallel to the stop block 13. Engaged on each end of the double screw member on opposite sides of the knife blade extension 14 is a flanged nut 15 and an apertured metal spacer 16 one end of which is round while the opposite end is straight to contact and align itself against the stop block 13. The multiple type element is adapted to be removably engaged as a unit on the double screw member with the forked ends of the end sections 5 of the fuse plates adapted to be separated by the knife blade extension 14 and the spacers 16. The straight end edges 8 of the fuse plates are adapted to seat squarely against the stop block 13 after which the retaining nuts 15 are tightened to hold the respective ends of the multiple type fuse element rigidly secured to its mounting and properly aligned therewith. The opposite end of the renewable multiple type fuse element is adapted to be similarly mounted in its knife blade type of support.

Figure 5:
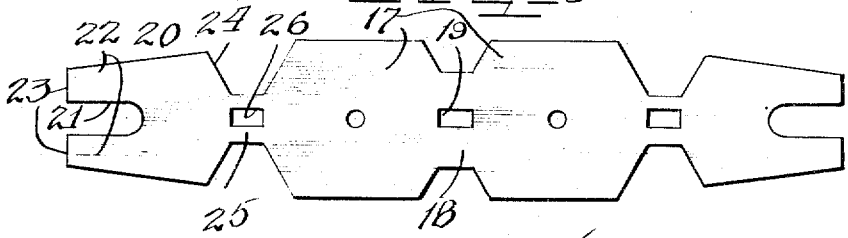
Figure 5 is a side elevation of the high capacity renewable fusing element illustrated in Figure 4.
Figure 4:
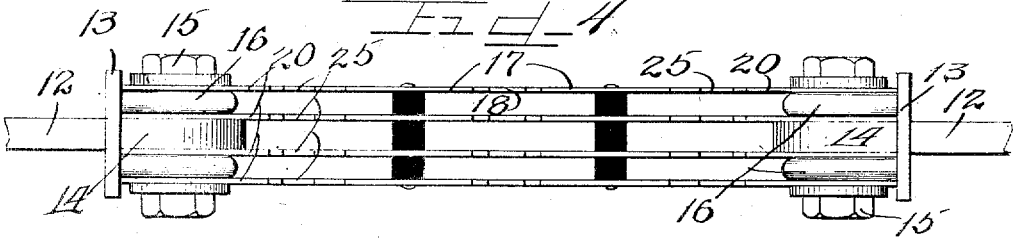
Figure 4 is an elevational view of a modified form of multiple type renewable fuse element adapted for high capacities and connected to knife blade mounting units.

Figures 4 and 5 illustrate a multiple type of renewable fuse element adapted for high capacities, and furthermore, adapted to be properly aligned between a pair of knife blade type supporting units of the type illustrated and described in connection with Figure 3. In this type of renewable fuse element unit each of the fuse elements or plates comprises a pair of intermediate sections 17 connected by means of a middle metal fusing section 18 having an elongated rectangular slot 19 therein. Connected to the outer end of each of the intermediate sections 17 is a tapered outer section 20 provided with an end notch 21 forming the reduced end of the outer section into a fork having tines 22 with straight transverse end edges 23. The enlarged inner end of each of the end sections is tapered at 24 and is integrally connected with its respective intermediate section 17 by means of a reduced fusing neck or section 25 smaller than the middle fusing section 18 and having a rectangular opening 26 therein.

Figure 6:
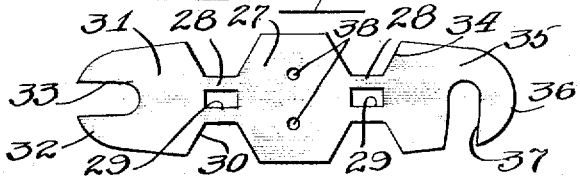
Figure 6 is a side elevation of a modified type of the renewable fuse element.
Figure 7:
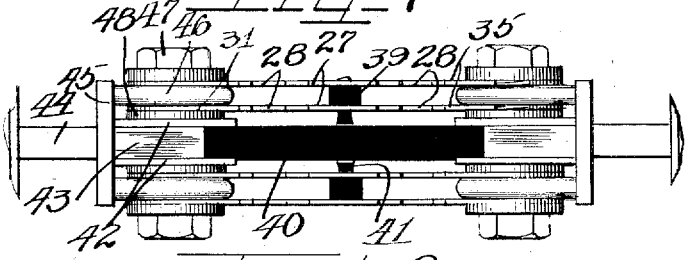
Figure 7 is a top plan view of the interior portion of a knife blade type fuse unit including a pair of dual type fuse elements of the type illustrated in Figure 6.

Figures 6 and 7 illustrate another modified form of renewable fuse element of a two plate type which consists of two renewable fuse elements each comprising an intermediate section 27 having integrally formed on each of the tapered ends thereof a reduced fusing section 28 provided with a rectangular slot 29. One of the reduced fuse sections 28 integrally connects up with the tapered end 30 of the enlarged end of a tapered end section 31 the outer end of which is rounded as at 32 and is provided with a longitudinal central notch 33 to afford a forked end for the section. Integrally connected with the outer end of the other fuse section 28 is a tapered end 34 of a tapered end section 35 the outer end of which is rounded at 36. Provided in one side of the tapered end section 35 is a slightly curved transverse notch 37 which forms the outer reduced end of the end section 35 into a hooked member. A pair of the fuse plates are adapted to be connected in spaced parallel relation by a pair of rivets 38 having insulating spacing sleeves 39 engaged thereon. The duplicate type fuse elements illustrated in Figure 6 are adapted to be mounted singly or in pairs on opposite sides of an insulating bar 40 provided with insulating bridging pins 41. The ends of the insulating bar 40 are connected by means of plates 42 to a knife blade extension 43 which is integrally formed on the inner end of a knife blade contact 44 and has a stop plate 45 rigidly mounted transversely thereon. Mounted transversely on the knife blade extension 43 is a double ended screw member on each end of which a movable spacer 46 and a nut 47 is engaged. Rigidly engaged around the supporting screw and adjacent one of the respective plates 42 is a stationary spacer or washer ring 48. To mount one of the renewable double type fuse elements on the mounting the notched end sections 31 are engaged over one projecting end of the screw and between the stationary washer 48 and the nut 47 with the spaced end sections 31 positioned on opposite sides of the spacer 46. The fuse element is then pivoted so that the opposite hooked end thereof may be swung into engagement to hook over a screw on the opposite end of the aligning bar 40 with the end sections 35 separated by the respective movable spacer 46. With the fuse element mounted in place it is only necessary to tighten the nuts 47 to removably hold the fuse element in place on its mounting. In this type of fuse construction the two duplicate type renewable fuse elements are separated by the insulating block or bar 40 and are spaced therefrom by means of the bridge pins 41 which serve to prevent contact of an overheated fuse element with the bar 40.

Figure 8:
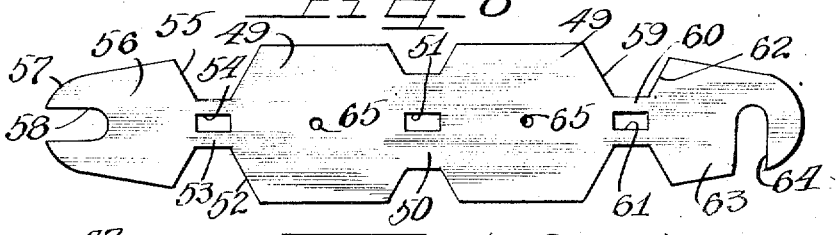
Figure 8 is a side elevation of still another type of renewable fuse element adapted for high capacity work.
Figure 9:
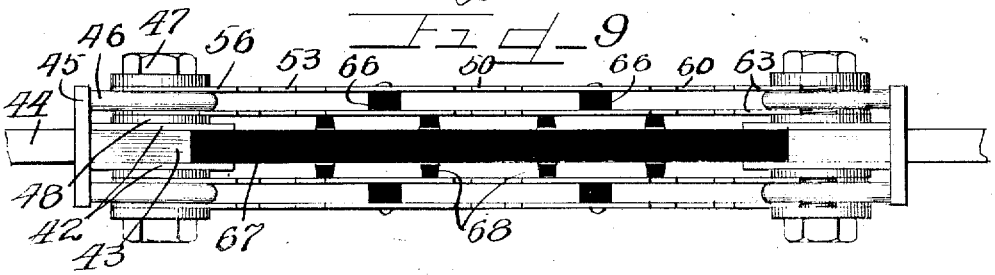
Figure 9 is a fragmentary elevational view of a fuse element mounting of the knife blade type carrying a plurality of renewable fuse elements of the type illustrated in Figure 8.

Figures 8 and 9 illustrate a high capacity renewable fuse element of the duplicate type consisting of two fuse elements or strips each comprising a pair of intermediate sections 49 connected by a reduced metal fusing section or neck 50 having a rectangular opening 51 therein. Integrally connected to a tapered end 52 of one of the intermediate sections 49 is a reduced outer fusing section or neck 53 having a rectangular opening 54 therein. The outer fusing section 53 integrally connects up with the inner tapered end 55 of the enlarged end of a tapered end section 56 the outer end of which is rounded as at 57 and is provided with a middle longitudinal notch 58 to form the rounded end into a forked member. Integrally connected to the tapered end 59 of the second intermediate section 49 is one end of a reduced neck or outer fusing section 60 having a rectangular opening 61 therein. The other end of the outer fusing section 60 is connected to the tapered end 62 of an outer tapered section 63 provided with a slightly curved transverse notch 64 in one side thereof to form the outer end of said end section 63 into a hooked member. In this high capacity type of renewable fuse element the two duplicate type renewable fuse elements are connected to have the intermediate sections 49 of one plate connected to those of an opposite plate by means of rivets 65 and insulating spacing sleeves 66. The end units provided for the mounting of the high capacity duplicate type of fuse element are constructed similar to the mountings illustrated and described in connection with Figure 7, except that a longer insulating bar 67 is provided with a plurality of insulating bridging pins 68 mounted on each side of the insulating bar. The other parts of the mounting are numbered similar to the numbering used in connection with Figure 7.

Figure 10:
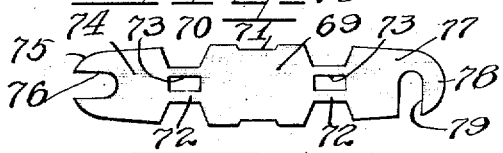
Figure 10 is a side elevational view of still another type of renewable fuse element.

Figure 10 shows another modified form of renewable fuse element compirsing an intermediate section 69 having tapered ends 70 and side notches 71. Integrally formed on the middle portion of each of the tapered ends 70 of the intermediate section 69 is a reduced fusing section or neck 72 provided with a rectangular slot 73. Integrally formed on the outer end of one of said fusing sections 72 is the enlarged end of a tapered end section 74 which is rounded at its reduced outer end as at 75 and is provided with a longitudinally disposed central notch 76. Integrally formed on the outer end of the other of said fusing section 72 is the enlarged end of a tapered end section 77 rounded at its reduced outer end as at 78. The tapered end section 77 is provided with a slightly curved transversely disposed side notch 79 providing a hooked end for the fuse element.

The particular type of renewable self aligning fuse elements illustrated in Figures 1 and 5 are adapted for use in a fuse mounting wherein the knife blade type supporting units are connected to one another by means of the improved fuse elements. In this type of element both of the tapered end sections are slotted longitudinally to provide forked ends, the outer or end edges of which are straight and are adapted to seat against the stop blocks 13 when the fuse elements are engaged on the mounting screws or bolts so that the fuse element is properly aligned with the knife terminals 12. To hold the fuse element secured in aligned position as described, it is merely necessary to tighten the retaining nuts 15.

The types of renewable fuse elements disclosed in Figures 6 to 10, inclusive, have the end section at one end thereof forked while the tapered end section at the other end is hook shaped due to the curved transverse notch which is provided therein. These renewable fuse elements may be used individually, in duplicate or in multiple, on fuse mounting devices, the end portions of which are permanently connected by means of an insulation bar or block as shown in Figures 7 and 9. The particular shape of the end sections of the renewable fuse elements permits the forked end section to be engaged on one of the supporting screws or bolts about which it may be pivoted so that the hooked end section may be moved into hooked engagement with a screw or bolt at the opposite end of the mounting. The fuse element is adapted to be renewably secured in proper aligned position by simply tightening the retaining nuts on the screw members.

The various types of renewable fuse elements described are substantially self aligning and are provided with an enlarged intermediate section or sections to lower the current density while the reduced fusing sections are provided with oblong holes or apertures to define the locations of maximum current density and to afford sections which may be evenly calibrated for amperage and voltage. The provision of straight sided or parallel fusing sections assures a sufficiently large area of the fuse element to melt under overload conditions to create a large gap. The peculiar tapered construction of the end sections of each fuse element where they join the reduced apertured fusing sections are provided for the purpose of affording a large area which will cool more rapidly after the blowing of a fuse element so that the possibility of the fusing extending into the end sections will be greatly reduced, thereby obviating the tendency of portions of said end sections from becoming fused onto the mounting members so that they cannot be removed therefrom without difficulty. The improved renewable fuse elements, therefore, permit the resultant end portions of a blown fuse element to be readily removed from their respective mountings since the possibility of fusing taking place between the tapered end sections and the respective mounting members is practically eliminated.

I am aware that many changes may be made, and numerous details of construction may be varied through a wide range without departing from the principles of this invention, and I therefore do not purpose limiting the patent granted hereon, otherwise than necessitated by the prior art.

I claim as follows:

1. As an article of manufacture, a replaceable fuse element comprising a strip of fuse material having each of its ends formed to slant outwardly in a direction toward the intermediate portion of the strip and a reduced apertured section between each slanting end and said intermediate portion, each of said sections being connected to the intermediate portion and the associated end by upwardly and outwardly slanting sides for concentrating fuse blowing currents on the reduced and apertured sections.

2. In a renewable fuse element structure including spaced terminals, a bridge member of insulating material therebetween, a pair of fuse elements on one side of the bridge member removably connected to said terminals, insulating means separating the fuse elements, and spacing means on the bridge member contacting one of said fuse elements.

3. In a renewable fuse element structure, spaced terminals, a bridge bar connecting the same, a plurality of sets of fuse elements connected to said terminals and disposed on opposite sides of the bridge bar, and spacing means projecting from the bridge bar into contact with said sets of fuse elements.

4. In a renewable fuse element structure including spaced terminals, an insulation bridge member therebetween, a pair of fuse elements one on each side of the bridge member, means carried by the terminals for holding the fuse elements secured in spaced parallel relation with respect to said bridge member, and insulation spacing means projecting from both sides of said bridge member into contact with the fuse elements.

5. In a renewable fuse element structure, spaced terminals, fuse elements therebetween, and insulating means disposed at right angles to and at spaced intervals between the fuse elements.

6. In a renewable fuse element structure, spaced terminals, fuse elements connected therebetween, and a plurality of insulating means arranged in spaced staggered relation separating the fuse elements.

7. In a renewable fuse element structure, spaced terminals, a plurality of sets of fuse elements connected to said terminals, insulating members disposed between the fuse elements of each set, and spacing means separating said sets of fuse elements.

8. In a renewable fuse element structure including spaced terminals, an insulation bridge member therebetween, a pair of fuse elements one on each side of said bridge member, and spacing means projecting in opposite directions from said bridge member into contact with both of said fuse elements.

In testimony whereof, I have hereunto subscribed my name at Chicago, Cook County, Illinois.

JOHN B. GLOWACKI.